United States Patent [19]

Herrmann

[11] Patent Number: 5,128,029

[45] Date of Patent: Jul. 7, 1992

[54] CONTINUOUS BACKWASHING FILTER APPARATUS WITH FILTERED FLUID RETENTION PLATE

[76] Inventor: Karl-Heinz Herrmann, 9201 Pleasure Ave., Apt. 201, Sea Isle, N.J. 08243

[21] Appl. No.: 499,476

[22] PCT Filed: Oct. 11, 1989

[86] PCT No.: PCT/US89/04261

§ 371 Date: Jun. 11, 1990

§ 102(e) Date: Jun. 11, 1990

[30] Foreign Application Priority Data

Oct. 11, 1988 [DE] Fed. Rep. of Germany ....... 3834642

[51] Int. Cl.$^5$ ............................................. B01D 29/68
[52] U.S. Cl. .................................... 210/107; 210/137; 210/411; 210/415; 210/416.1; 210/497.01; 210/498; 210/500.1
[58] Field of Search ............... 210/107, 108, 350, 391, 210/393, 411, 413, 97, 143, 232, 445, 450, 499, 500.1, 503, 276, 408, 137, 498, 416.1, 497.01, 415

[56] References Cited

U.S. PATENT DOCUMENTS

| | | | |
|---|---|---|---|
| 86,158 | 1/1869 | Houston | 210/420 |
| 1,062,236 | 5/1913 | Hitchcock | 210/420 |
| 1,181,387 | 5/1916 | Joerin, Jr. et al. | 210/282 |
| 1,478,125 | 12/1923 | Kear | 137/625.32 |
| 2,178,240 | 10/1939 | Pascale | 183/112 |
| 2,227,302 | 1/1941 | Edstrom | 15/14 |
| 2,256,279 | 9/1941 | Farmer et al. | 183/39 |
| 2,775,348 | 12/1956 | Williams | 210/94 |
| 3,048,191 | 8/1962 | Crang | 137/625.32 |
| 3,074,560 | 1/1963 | Kinney | 210/411 |
| 3,080,977 | 3/1963 | Jones | 210/232 |
| 3,239,061 | 3/1966 | Horning et al. | 210/108 |
| 3,306,451 | 2/1967 | Kudlaty | 210/135 |
| 3,357,566 | 12/1967 | Schmid et al. | 210/411 |
| 3,367,506 | 2/1968 | Rosaen | 210/408 |
| 3,425,557 | 2/1969 | Rosaen | 210/408 |
| 3,574,509 | 4/1971 | Zentis et al. | 210/108 |
| 3,635,348 | 1/1972 | Carr | 210/333 |
| 3,640,395 | 2/1972 | Kinney | 210/334 |
| 3,669,269 | 6/1972 | Kinney | 210/122 |
| 3,709,362 | 1/1973 | Lindstol | 210/108 |
| 3,746,171 | 7/1973 | Thomsen | 210/424 |
| 3,750,885 | 8/1973 | Fournier | 210/107 |
| 3,757,956 | 9/1973 | Bradel et al. | 210/333 |
| 3,784,016 | 1/1974 | Akiyama | 210/333 |
| 3,853,761 | 12/1974 | McClory | 210/100 |
| 3,907,688 | 9/1975 | Close | 210/424 |
| 3,926,815 | 12/1975 | McClory | 210/424 |
| 3,935,106 | 1/1976 | Lipner | 210/232 |
| 3,940,222 | 2/1976 | Zink | 425/199 |
| 4,011,662 | 3/1977 | Davis et al. | 34/90 |
| 4,059,422 | 11/1977 | Steiner | 55/418 |
| 4,070,288 | 1/1978 | Gerteis | 210/86 |
| 4,082,664 | 4/1978 | Lindstol; | 210/80 |
| 4,082,673 | 4/1978 | Cilento | 210/234 |
| 4,085,051 | 4/1978 | Kaminsky et al. | 210/411 |
| 4,152,265 | 5/1979 | Meyers | 210/276 |
| 4,156,651 | 5/1979 | Mehoudar | 210/108 |
| 4,169,789 | 10/1979 | Lerat | 210/636 |
| 4,271,020 | 6/1981 | Van Meter | 210/133 |

(List continued on next page.)

FOREIGN PATENT DOCUMENTS

| | | | |
|---|---|---|---|
| 410680 | 3/1925 | Fed. Rep. of Germany | 137/625.22 |
| 733157 | 10/1932 | France | 210/229 |
| 1109656 | 1/1956 | France | 137/625.23 |
| 23867 | of 1913 | United Kingdom | 210/483 |
| 842669 | 7/1960 | United Kingdom | 210/229 |
| 1215700 | 12/1970 | United Kingdom | 137/625.23 |

Primary Examiner—W. Gary Jones
Assistant Examiner—Joseph Drodge
Attorney, Agent, or Firm—Parkhurst, Wendel & Rossi

[57] ABSTRACT

Filter apparatus for continuously filtering fluids containing large amounts of particles, including large amounts of ultrafine particles. The filter apparatus includes filter media and a backwash system which continuously removes deposited filtrate from an inlet side of the filter media. The filter apparatus also includes means for at least temporarily retaining filtered fluid in an outlet chamber of the apparatus at a location immediately proximate an outlet side of the filter media, such that backwashing of the filter means occurs continuously and instantaneously as filtered fluid passes through the filter means.

59 Claims, 6 Drawing Sheets

U.S. PATENT DOCUMENTS

| | | | |
|---|---|---|---|
| 4,411,779 | 10/1983 | McConnell, III | 210/108 |
| 4,462,916 | 7/1984 | Ecabert et al. | 210/411 |
| 4,504,389 | 3/1985 | Rundzaitis | 210/266 |
| 4,529,515 | 7/1985 | Selz | 210/234 |
| 4,654,142 | 3/1987 | Thomsen et al. | 210/232 |
| 4,702,269 | 10/1987 | Schuler | 137/246.2 |
| 4,731,183 | 3/1988 | Schumacher, II | 210/419 |
| 4,759,846 | 7/1988 | MacFarlane | 210/393 |
| 4,841,595 | 6/1989 | Wiese | 15/352 |

CONTINUOUS BACKWASHING FILTER APPARATUS WITH FILTERED FLUID RETENTION PLATE

BACKGROUND OF THE INVENTION

The present invention relates to a continuous backwashing filter apparatus for separating particulate matter from a fluid medium. The continuous backwashing feature enables continuous filtering of a fluid medium containing particles having a broad particle size distribution, including ultrafine particles, without necessitating the use of more than one filtering stage.

Conventional filter arrangements have been known wherein a backwash device is provided proximate an inlet side of a filter element in the filter arrangement. For instance, U.S. Pat. No. 4,085,051 to Kaminsky et al. discloses a self-cleaning filter for separating solid particles from a liquid wherein a device for backwashing the filter element abuts the filter element and is rotated about a central shaft such that the filter element can be backwashed of any accumulated particles. However, the backwashing function requires a pressure differential between an inlet chamber and an outlet chamber of the filter apparatus due to the buildup of particulate matter on the inlet side of the filter element.

The present applicant believes that occurrence of the necessary pressure differential further requires the presence of a substantial amount of filtered fluid in the outlet chamber. Stated differently, filtered fluid must be present at an outlet side of the filter to provide a liquid medium passing in a reverse direction through the filter to transport the particulate matter off of the inlet side of the filter and into the backwashing device. However, such filtered fluid is not always present at the outlet side in the Kaminsky et al. device. When filtering fluids having particles of a broad particle size distribution, it is inevitable that the filter element will become clogged before there is a sufficient amount of filtered fluid in the outlet chamber to facilitate the backwashing function.

U.S. Pat. No. 3,635,348 to Carr discloses an automatic self-cleaning strainer which provides a backwash device in abutted contact with an inlet side of a filter element in the strainer. The filter element is shaped like a truncated cone and the shape of the contacting surface of the backwash device is complimentary to the inlet side of the filter element. The backwash device is retractable along a central axis of the filter element to facilitate sequential radial movement of the backwash device within the filter element. This strainer apparatus cannot provide continuous backwashing due to the sequential action of the backwash device. As a result, the efficiency of the strainer apparatus is degraded.

The present applicant believes that the Carr strainer apparatus also suffers from the problem encountered in the filter apparatus of Kaminsky et al., in that the backwashing function is contingent upon whether the outlet chamber is filled with filtered fluid, i.e., whether filtered fluid is present proximate an outlet side of the filter element. Accordingly, the strainer apparatus of Carr cannot filter fluid mediums having a broad particle size distribution including ultrafine particles, since it is inevitable that the filter element will become clogged before the outlet chamber is filled with filtered fluid to facilitate the backwashing function.

U.S. Pat. No. 3,640,395 to Kinney discloses an automatic self-cleaning strainer having a plurality of filter stages including backwash devices in loose contact with an inlet side of the filter elements of each filtering stage. Each of the backwashing devices is in communication with a hollow shaft which is open to the atmosphere. However, the present applicant believes that before the backwashing function will occur, filtered fluid must be present in the outlet chambers of each filtering stage. Therefore, the strainer apparatus cannot filter a fluid medium which contains large amounts of particulate matter including ultrafine particles, since the filter elements in each stage will become clogged before the outlet chambers are filled with filtered fluid to facilitate the backwashing function.

U.S. Pat. No. 3,669,269 to Kinney discloses a filter apparatus having a rotating cylindrical strainer element and a stationary backwash chamber in contact with an inlet side of the strainer element. However, the present applicant believes that in the Kinney '269 device, as in the other prior art, the outlet chamber within the strainer element must be substantially full of filtered fluid before the backwashing function will occur which does not necessarily always occur in the Kinney '269 device. Thus, this strainer apparatus suffers from the same problems as discussed above.

SUMMARY OF THE INVENTION

An object of the present invention is to overcome the above-discussed drawbacks of conventional filter apparatus as recognized only by the present applicant, by backwashing the filter means as soon as filtered fluid passes through the filter means. As a result, clogging of the filter means will not occur.

Another object of the present invention is to provide a filter apparatus comprising structurally rigid filter means and a backwash housing for continuously backwashing the filter means, comprising at least one sliding shoe in sliding contact with an inlet side of the filter means. The sliding shoe has a slit therethrough which provides communication between a substantial length of the filter means and an interior of the backwash housing, such that the sliding shoe forms a leak-proof seal between the interior of the backwash housing and the inlet means of the filter apparatus. The filter apparatus also comprises means for retaining filtered fluid, and thus providing back pressure, in the outlet means of the filter apparatus, at a location immediately proximate an outlet side of the filter means. The backwash housing in conjunction with the means for retaining filtered fluid in the outlet means provide continuous backwashing of the filtering means immediately after filtered fluid passes through the filter means.

Another object of the present invention is to provide a filter apparatus comprising a stationary, structurally rigid filter means between the inlet and outlet means of the filter apparatus, and a rotating backwash housing comprising at least one sliding shoe in sliding contact with an inlet side of the filter means. The filter apparatus also comprises means for retaining filtered fluid, and thus providing back pressure, in the outlet chamber at a location immediately proximate an outlet side of the filter means. The means for retaining filtered fluid comprises a support plate having an upper surface which contacts and supports the filter means either directly or through a lower perforated member. The upper surface includes a plurality of concentric grooves and a plurality of radial grooves in communication with a central opening through the support plate. The concentric grooves at least temporarily retain filtered fluid in contact with an outlet side of the filter means, such that the backwashing function of the backwash housing can occur substantially instantaneously after filtered fluid passes through the filter means.

Still another object of the present invention is to provide a filter apparatus comprising a cylindrical, structurally rigid filter means which rotates about a central axis thereof, and a stationary backwash housing comprising at least one sliding shoe in contact with an inlet side of the filter means. The filter apparatus also comprises means for retaining filtered fluid, and thus providing back pressure, in the outlet means at a location immediately proximate an outlet side of the filter means, wherein the means for retaining filtered fluid comprises a solid, permeable filtering medium provided in the outlet chamber in contact with the outlet side of the filter means.

Still yet another object of the present invention is to provide a filter apparatus which comprises a stationary, structurally rigid filter means located between the inlet and outlet means of the filter apparatus, an upper backwash housing comprising at least one sliding shoe in rotating contact with an inlet side of the filter means, and a lower backwash housing comprising at least one sliding shoe in contact with an outlet side of the filter means. The upper and lower backwash housings synchronously rotate on respective sides of the filter means, such that the lower backwash housing provides back pressure in the outlet means at a location immediately proximate the outlet side of the filter means.

BRIEF DESCRIPTION OF THE DRAWINGS

The foregoing objects, as well as other features of the present invention, will be better understood with reference to the following drawings of various embodiments of the present invention.

DETAILED DESCRIPTION

A first embodiment of the present invention will be described in detail with reference to FIGS. 1-3.

Figure 1:
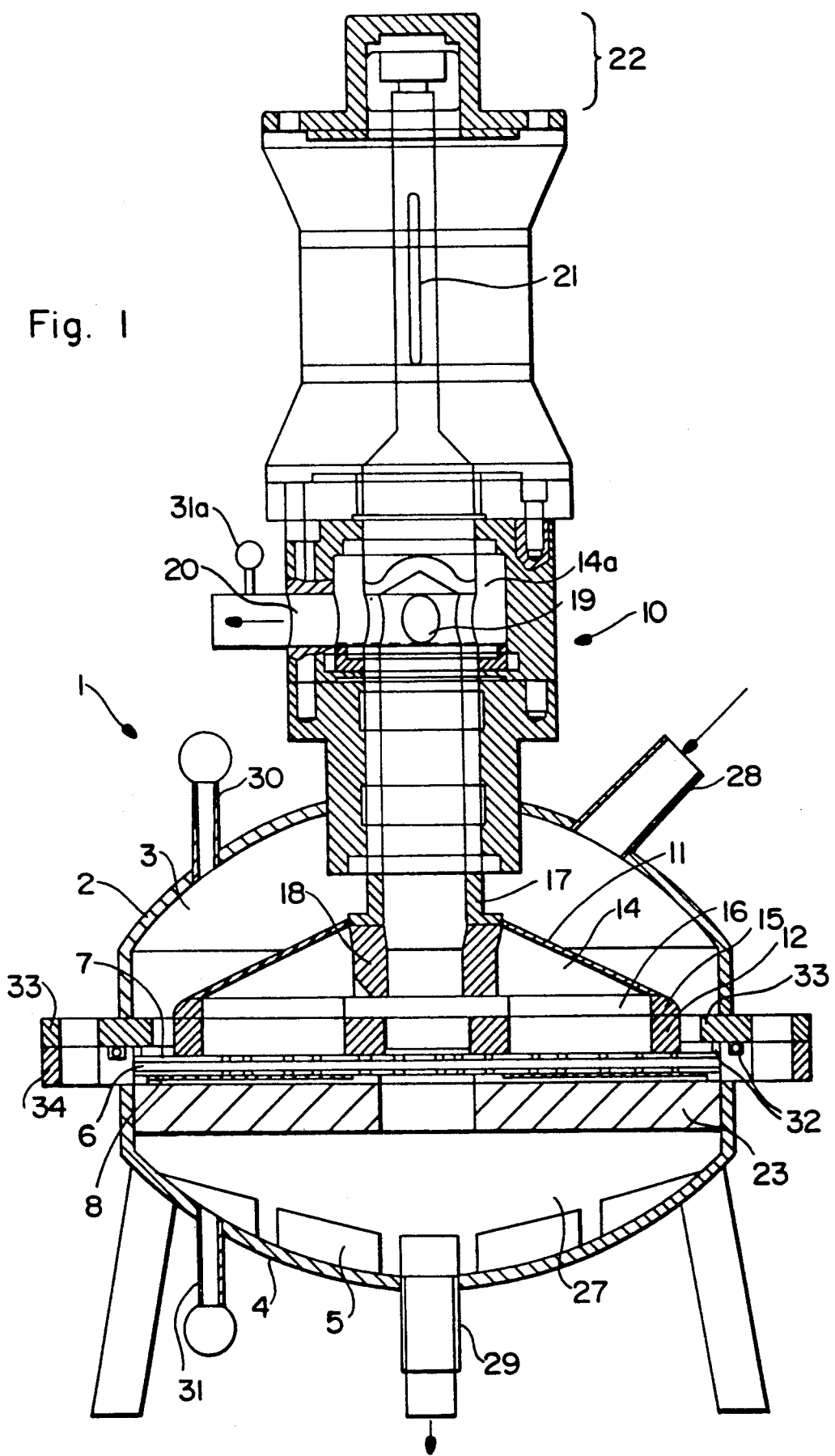
FIG. 1 is a cross-sectional side view of one embodiment of the filter apparatus of the present invention.

FIG. 1 shows a filter apparatus 1 having an upper compartment 2 comprising an inlet chamber 3 and a lower compartment 4 comprising an outlet chamber 5. Filter means or media 6 are fixed between the upper compartment 2 and lower compartment 4 to separate the inlet chamber 3 from the outlet chamber 5. Positioned above filter means 6 is an upper perforated plate 7 in communication with the inlet chamber 3. The upper perforated plate 7 preferably has an elastic or rubber coated lower surface to enhance transport of fluid through filter means 6. Below filter means 6 is a lower perforated plate 8 in communication with the outlet chamber 5. The perforated plates include a plurality of holes therethrough in substantially radial rows. Other members which serve the same purpose as the perforated plates, may include, for example, woven tele-wire fabric mesh which can be used particularly for the lower perforated plate 8. For increased efficiency, the perforated plates 7 and 8 should be arranged such that the perforations in each plate are in substantial axial alignment. The perforated plates aid in securing the filter means 6 within the filter 1. However, the perforated plates, particularly, the lower perforated plate 8, may not be necessary if the filter means is of sufficient mechanical strength and rigidity. The surfaces of the perforated plates which contact the filter means 6 should be very smooth when the filter means is susceptible to puncture. The filtering medium of the filter means 6 can include any suitable filtering material, such as fibercloth, metal mesh, sintered ceramic, sintered metal, and the like, depending upon the size of the particles contained in the unfiltered fluid medium, the chemical nature of the fluid, and the desired results. Filter media having absolute pore size of greater than about one micron typically can be used in the present invention at relatively low operating pressures. However, filter media having absolute pore size of less than about one micron may also be used where the particulate solids in the dirty fluids require such ultrafine particle removal.

The filter apparatus 1 further includes a backwash housing 10, having a diametrically elongate backwash hood 11 defining a backwash chamber 14, and at least one sliding shoe 12 in contact with an inlet side of the filter means through the upper perforated plate 7. The sliding shoe 12 is preferably designed such that its lower surface covers at least two circumferentially adjacent rows of holes in the perforated plate 7. As discussed above, if the filter means 6 is mechanically sound and has negligible interconnected porosity laterally within its thickness, the upper perforated plate may not be necessary. However, in most instances, the filter means 6 has substantial interconnected porosity in its lateral direction, thereby necessitating the use of the upper perforated plate 7.

Figure 2A:
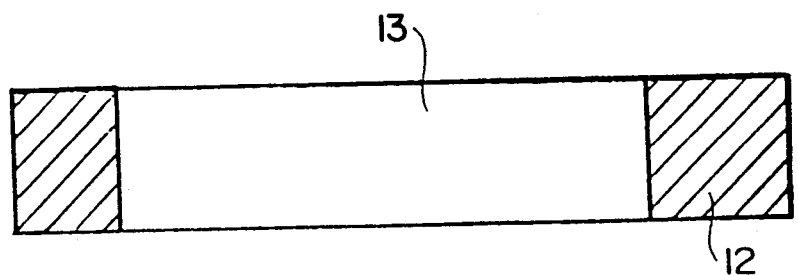
FIGS. 2a and 2b are cross-sectional side and plan views, respectively, of one of the sliding shoes employed in the backwash housing of the filter apparatus shown in FIG. 1.
Figure 2B:
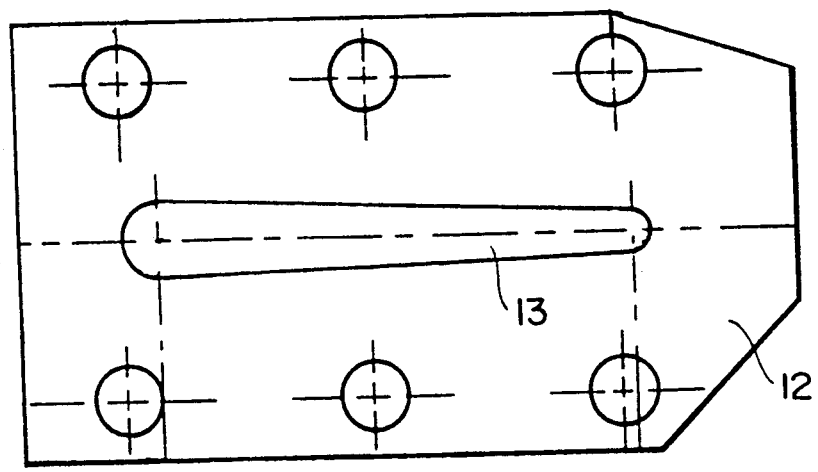

The sliding shoes can be made of any substantially rigid material which will provide a virtually leak-proof seal between the inlet chamber 3 and the backwash chamber 14. A preferable material is polytetrafluoroethylene. FIGS. 2a and 2b show that the sliding shoe 12 has a slit or opening 13 formed therethrough which provides the only communication between the inlet side of the filter means 6 and the backwash chamber 14 defined by the backwash hood 11. The opening 13 passing through the sliding shoes 12 is typically a radial slit whose width narrows from a radially outer portion of the shoe 12 towards a radially inner portion of the shoe 12. The shape of the radial slit facilitates transport of accumulated particles from a radically outer peripheral portion of the filter means 6 towards an inner peripheral portion thereof. The sliding shoes 12 are fixed to the backwash hood 11 through a plate member 15 having slits 16 formed therethrough in alignment with the slits 13 in the sliding shoes 12, to provide communication between the inlet side of the filter means 6 and the backwash chamber 14.

The backwash hood 11 is fixed to a hollow shaft 17 disposed within the backwash housing 10. The interior of the hollow shaft 17 is in communication with the backwash chamber 14 through radial openings 18 at a lower end thereof. The hollow shaft 17 also includes radial holes 19 in an upper end thereof to provide communication between the backwash chamber 14 and a backwash outlet 20 in the backwash housing 10, via a backwash collector chamber 14a. The hollow shaft 17 is rotated by a motor (not shown) through a variable transmission 21. The rotation speed (rpm) of the hollow shaft 17 and thus, backwash hood 11, may be varied as a function of the amount of particulate buildup on the inlet side of the filter means 6. If there is a large amount of particulate matter buildup, then the rotation of the hollow shaft 17 can be reduced to allow more intensive cleaning of the filter means or increased to facilitate rapid removal of the particulate matter. Most often it will be necessary to increase the shaft rotation speed when large amounts of particulate matter are present. Typically, the backwash hood is rotated at a rotational speed of not more than more than about 12 rpm.

Means for adjusting an axial position of the hollow shaft 17 and accordingly, the contact pressure between the sliding shoes 12 and the upper perforated plate 7 are located at an uppermost end of the hollow shaft, and are designated generally as 22. The means for adjusting can include a spring member, bolt member, hydraulic cylinder, and the like. A typical load applied on the vertical shaft member 17 by the means for adjusting 22 is about 30 kg when the pressure at which the unfiltered fluid is introduced into the inlet chamber is about 7 bars. The load can be increased proportionally with higher operating pressures.

Figure 3A:
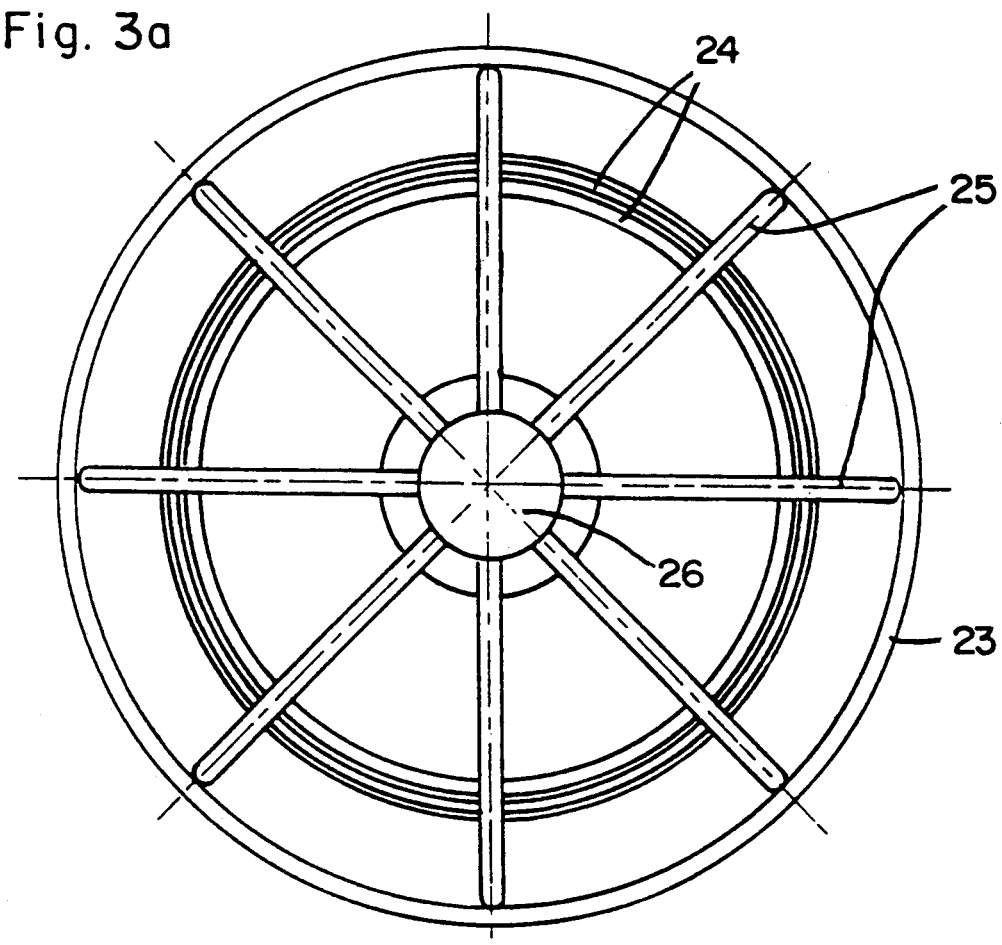
FIGS. 3a and 3b are partial plan and cross-sectional side views, respectively, of the lower support plate of the filter apparatus shown in FIG. 1.
Figure 3B:
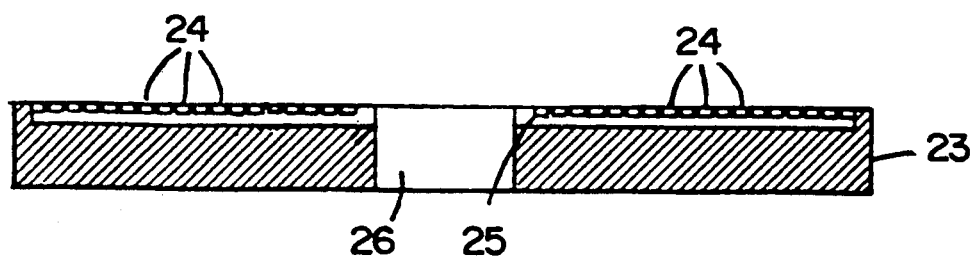

The filter means 6 is supported on a lower support plate 23 which, as a preferred embodiment, is more clearly shown in FIGS. 3a and 3b. The lower support plate 23 includes a plurality of concentric grooves 24 and a plurality of radial grooves 25 in communication with a central opening 26 which passes through the support plate 23. The concentric grooves 24 are preferably each not greater than 6 mm in depth. Depending upon the particle size range of particles being filtered, the depth of each concentric groove 24 can be about 0.5 mm. The support plate 23 is arranged on radially extending support members 27 located and typically fixed in the lower compartment 4 of the filter apparatus 1, as shown in FIG. 1.

In operation, an unfiltered fluid is introduced into the inlet chamber 3 through inlet 28 and contacts the inlet side of the filter means 6. The unfiltered fluid is pressurized when entering the inlet 28 to facilitate transport of the fluid through the filter means 6. When the porosity of the filter medium is more than about one micron, the steady state inlet pressure is preferably in the range of about 1.5 to about 7.5 bars. The inlet pressure can be controlled by any suitable means, for example, adjustable choke means placed in the inlet 28, but normally, the inlet pressure is sufficiently high (i.e., higher than the pressures in the outlet chamber and backwash housing) and requires no other control. The filtered fluid exits the outlet side of the filter means 6 and is transported into the outlet chamber 5 via the concentric grooves 24, radial grooves 25, and central opening 26 in the lower support member 23. The outlet chamber can be of negligible volume, and is present in this embodiment for illustrative purposes only. In fact, the central opening 26 can be restricted by a valve member, thus limiting the outlet chamber to the volume defined between the filter means 6 and the support plate 23. The volume of the outlet chamber should be reduced as the particle size of filtered particles becomes smaller, to facilitate immediate backwashing of the filter means. The filtered fluid, or filtrate, exit the filter apparatus 1 through outlet 29. The pressure in the outlet chamber 5 is also controlled to facilitate the backwashing function. Such control can comprise adjustable choke means and the like provided in the outlet means 29. The amount of pressure in the outlet chamber 5 depends upon the size, amount, and characteristics of the particulate matter in the unfiltered fluid, but must be higher than the pressure in the backwash housing, as explained below.

Substantially all of the particulate matter present in the unfiltered fluid medium is trapped on the inlet side of the filter means 6. The backwash hood 11 is rotated via the hollow shaft 17 about a central axis normal to the filter means 6, such that the slits 13 in the sliding shoes 12 provide a backwash rinsing area on the inlet side of the filter means 6. As discussed above, the pressures in outlet chamber 5, and backwash housing 11, and in the inlet chamber 3, if necessary, are controlled such that the pressure in the backwash housing 11 is lower than the pressure in the outlet chamber 5. Ideally, the pressure in the backwash chamber is zero bar, but unavailable minor leakage from the inlet chamber to the backwash chamber through the sliding shoes essentially prevents such a pressure from being obtained. As with the pressures in the inlet and outlet chambers, the pressure in the backwash housing can be controlled by adjustable choke means placed in the backwash outlet 20. A backwash pressure of 1 bar will remove most particles of nominal size. Adjustment of the pressures, particularly in the backwash housing and the outlet chamber, is of course dependent upon the nature of the unfiltered fluid and solids to be treated. The primary control parameters for providing successful filtering in the apparatus of the present invention are the pressure controls in the outlet and backwash chambers, the speed of rotation of the backwash hood, and the selection of the filter media.

As a result of the above operation, filtered fluid passes in a reverse direction through the filter means 6 at locations corresponding to the rinsing area defined by the slits 13 in the sliding shoes 12, to remove particulate matter accumulated on the inlet side of the filter means 6. Such particulate matter is transported, by the filtered fluid which passes back through the filter means 6, the slits 13 in the sliding shoes 12, the backwash chamber 14, the radial openings in the hollow shaft 18, and the radial holes in the upper portion of the hollow shaft 19, and finally exits the filter apparatus 1 via the backwash outlet 20.

The filter apparatus of the present invention is capable of filtering and backwashing ultrafine particulate matter, e.g., on the order of tens of microns or less. Indeed particulate matter of sizes as small as 0.025 microns in nominal particule size have been removed from fluids by the apparatus of the present invention. The concentric grooves 24 in the lower support plate 23 constitute a flow-through brake which at least temporarily retains a sufficient amount of filtered fluid immediately adjacent the downstream side of the filter means to facilitate immediate backwashing of the filter means 6 from the very onset of filtration. More specifically, the concentric grooves 24 and radial grooves 25 provide a retention area for the filtered fluid over the entire area of the outlet side of the filter means 6. This at least temporary, and instantaneous, retention of filtered fluid, in conjunction with the control of pressures in the various areas of the filter 1, as discussed above, provides superior filtering and backwashing functions. The entire filter means 6 thus can be continuously backwashed as soon as filtered fluid passes through the filter means 6. Therefore, there is no opportunity for filter means 6 to become clogged before there is a sufficient amount of filtered fluid in the outlet chamber 5 to facilitate the backwashing function. As a result, the filter apparatus can easily filter fluids which contain particles of a broad particle size distribution, including particles in the submicron range.

The filter apparatus of the present invention can filter substantially all types of fluids in a single stage, i.e., there is essentially no need for multiple filtering stages to accommodate filtering of fluids having different sized particles. The support plate 23 also prevents buckling or bending of the filter means, to thus ensure the seal between the inlet and backwash chambers via the sliding shoes. The configuration of the lower support plate is a preferred embodiment. Any equivalent structure which provides the desired, at least temporary, retention and support functions may work equally as well. As explained above, if the lower support plate fails adequately to support the filter means or fails to retain the filtered fluid, the filter apparatus will not function properly.

The efficiency of the filter apparatus and its ability to filter very fine particles from a fluid medium, as well as particles of a broad particle size range, can be influenced by several factors.

First, the sliding shoes 12 must be in very tight abutting contact with the inlet side of filter means 6, via the upper perforated plate 7, such that a virtually leak-proof seal exists between the inlet chamber 3 and the backwash housing 11. If the seal between the inlet chamber 3 and the backwash housing 11 is not maintained, then there is a chance that the high pressure, unfiltered fluid will leak under the sliding shoes 12 and exit the filter through the backwash outlet 20, and thus not pass through filter means 6, thus decreasing filter efficiency.

Second, as discussed above, the pressures in each of the outlet chamber 5, and backwash housing 11, and inlet chamber 3, if necessary, must be controlled such that the pressure in the backwash housing 11 is lower than the pressure in the outlet chamber 5. Means for controlling the pressures can include adjustable choke means, which may be manual, electronic, or the like, on the inlet means 28, the outlet means 29, and/or the backwash outlet 20, and can also include a suction pump (not shown) attached to the backwash outlet. Such auxiliary suction means are particularly desirable when particulate matter such as fibers are being filtered, since such fibers may become entangled within the porosity of the filter means 6. The pressures in each chamber can be monitored by pressure gauges 30, 31 and 31a disposed in the inlet, outlet and backwash chambers, respectively. The means for controlling the pressures can be adjusted to control the backwash flowrate of the filter apparatus. Such means for controlling the pressures can readily be adapted to computer automation. For example, an electronic light detection system can be employed to detect the amount of particulate matter build-up on the inlet side of the filter means 6. The data supplied by the system can then be communicated to a computer for controlling the adjustable choke means and the rotation speed of the hollow shaft 17.

Third, as discussed above, the speed of rotation of the hollow shaft 17 and thus, the backwash hood 11, must be controlled as a function of the amount of build-up of filtrate on the inlet side of the filter means 6. In cases where the unfiltered fluid medium does not contain relatively large amounts of particulate matter, the speed of rotation of the hollow shaft 17 and backwash hood 11 can be substantially reduced. Conversely, when the unfiltered fluid includes relatively large amounts of particulate matter, such as raw sewage for example, the speed of rotation can be significantly increased. If, however, the large amount of particulate matter has a broad particle size distribution, it may be necessary to reduce the rotation speed of the hollow shaft 17 to permit intensive localized cleaning of the filter means 6.

Fourth, a leakproof seal must also be maintained between the inlet chamber 3 and the outlet chamber 5, i.e., the filter means 6 must be radially sealed within the filter apparatus 1. This leak-proof seal can be insured by the use of o-ring members 32 disposed between a flange 33 fixed on the upper compartment 2 and the filter means 6 and/or a flange 34 fixed on the lower compartment 4. Any leakage at this portion of the filter apparatus 1 will cause the unfiltered fluid to pass around the filter means 6, rather than through the filter means 6, resulting in contamination of the desired filtrate with unfiltered fluid.

Fifth, the lower support plate 23 must be very rigid to provide adequate support for the filter means 6. Otherwise, the filter means will tend to sag or buckle, due to the high pressures employed during operation of the filter apparatus, and the seal between the sliding shoes 12 and the inlet side of the filter means 6 will be impaired or broken.

Additionally, sufficient back pressure and a sufficient amount of filtered fluid must be provided immediately proximate the outlet side of the filter means 6. The concentric grooves 24 in the lower support plate 23 help to provide these features, such that the backwashing of any portion of the entire filter means 6 can be initiated as soon as filtered fluid passes through the filter means 6. Accordingly, as discussed above, the filter apparatus 1 is capable of continuously filtering ultrafine particles from an unfiltered fluid and there is no possibility that the filter means 6 will become clogged before the backwashing function can be employed. The concentric slotted support plate 23 discussed above is a preferred embodiment of the present invention, but other equivalent support structures not discussed herein, but providing substantially the same functions as the concentrically grooved support plate 23, may work equally as well.

The manner in which the pressures in the outlet and backwash chambers, as well as the speed of rotation of the backwash hood, should be monitored and controlled are explained below.

The unfiltered fluid entering the inlet chamber usually is at a sufficiently high pressure that no pressure control thereof is necessary. As increased amounts of particles accumulate on the inlet side of the filter means, it becomes necessary to rotate the backwash hood to initiate backwash cleaning of the filter means. The volume of filtrate exiting the outlet means and the volume of backwash, i.e., mixture of fluid passing back through the filter means and entraining solids from the filter means, exiting the backwash outlet is controlled by the respective valve and/or choke means positioned in the outlet means and backwash outlet. If more filtered fluid is needed to backwash the filter means, then the choke means in the outlet means can be restricted. If the amount of particle buildup on the filter means increases, then the choke means in the backwash outlet should be slightly opened and the speed of rotation of the backwash hood should be increased. It may sometimes be advantageous to allow a bed of filtered particles to build up on the filter means. In such a case, the backwash outlet is restricted and the rotation speed of the backwash hood is reduced.

Of course, manipulation of the outlet pressure, backwash pressure, and backwash hood rotation speed depends upon the nature of fluid being filtered and will thus have to be adjusted accordingly. Examples of the pressure values chosen when filtering particular fluids are given in the examples below herein.

Figure 4:
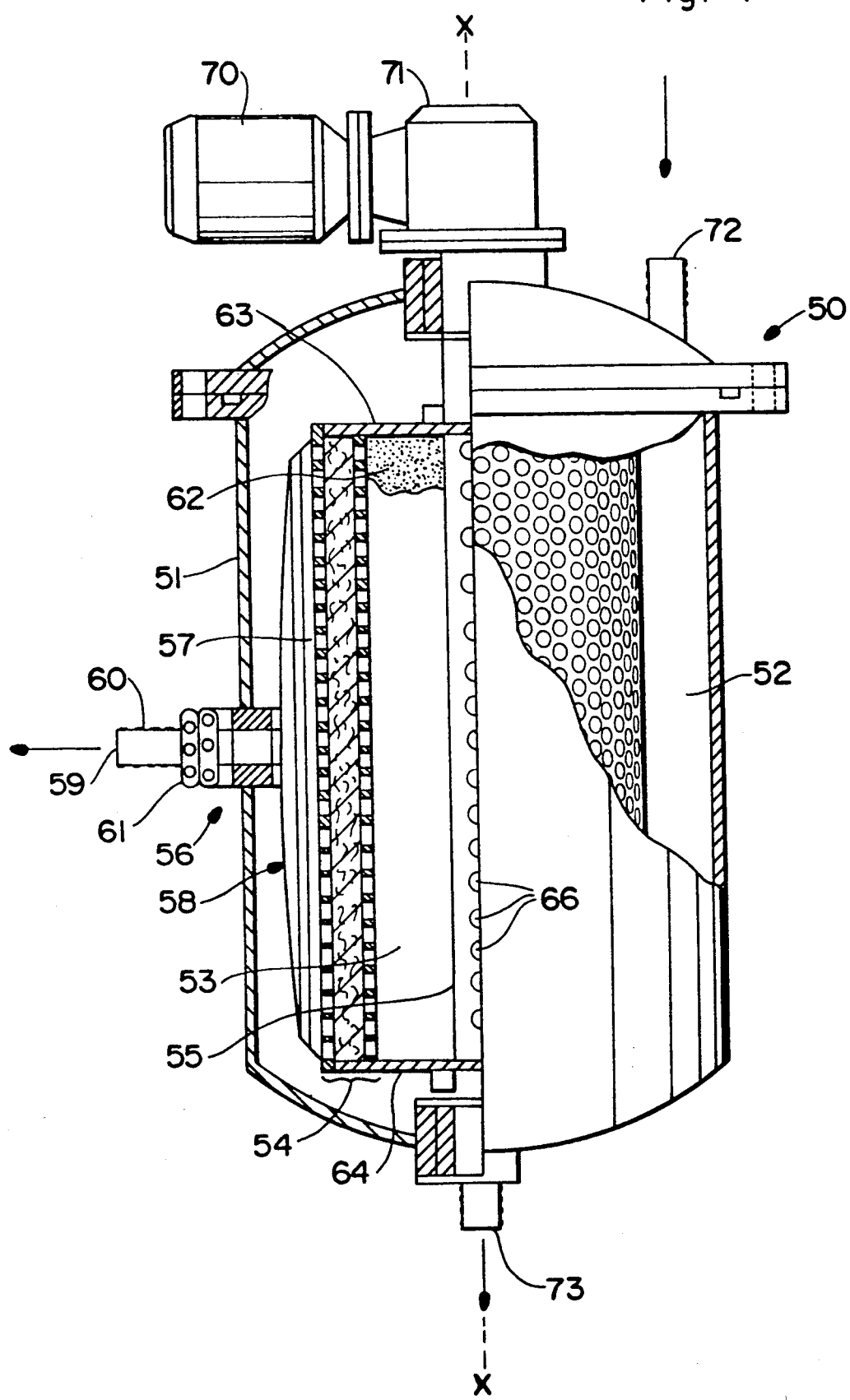
FIG. 4 is a partial cross-sectional side view of another embodiment of the filter apparatus of the present invention.

Another embodiment of the filter apparatus of the present invention is shown in FIG. 4. The filter apparatus 50 includes a filter housing 51 comprising an inlet chamber 52, an outlet chamber shown generally at 53 and cylindrical, structurally rigid filter means 54 located between the inlet chamber 52 and the outlet chamber 53. The cylindrical filter means 54 include an elongate shaft 55 coaxially arranged with the central axis of rotation of the cylindrical filter means. The cylindrical filter means 54 are rotatable within the filter housing 51 about the same axis. The cylindrical filter means 54 are rotated about the central axis via the elongate shaft 55 and via a motor 70. The rotatory power of the motor 70 is transmitted to the elongate shaft 55 through variable transmission means 71. The motor 70 and variable transmission means 71 permit control of the rotating speed of the cylindrical filter means 54 as a function of the amount of filtrate accumulated on the inlet side of the filter means 54.

A stationary backwash housing 56 comprising at least one shoe 57 is in abutted, sliding contact with the inlet side of the filter means 54 along a region parallel to the central axis of the cylindrical filter means 54. The sliding shoe 57 has an elongate slit therethrough which provides communication between a substantial length of the surface of the cylindrical filter means 54 and an interior of the stationary backwash housing 56. As in the embodiment shown in FIGS. 1-3, the sliding shoe 57 provides a virtually leak-proof seal between the interior of the backwash housing 56 and the inlet chamber 52.

The backwash housing 51 further comprises a backwash hood 58 which defines a backwash chamber proximate the filter means 54, a backwash outlet 59, and an adjustable nozzle arm 60 fixed to the backwash hood 58. The adjustable nozzle arm 60 provides communication between the backwash chamber defined within the backwash hood 58 and the backwash outlet 59. The adjustable nozzle arm 60 includes means 61 for adjusting a radial position of the adjustable nozzle arm vis-a-vis the cylindrical filter means. The means 61 for adjusting the radial position of the adjustable nozzle arm 60 permit control of the contact pressure between the stationary sliding shoe 57 and the rotating filter means 54.

The filter apparatus 50 further comprises means for at least temporarily retaining filtered fluid in the outlet chamber 53 at a location immediately proximate an outlet side of the filter means 54. These means can include a solid, air permeable secondary filtering medium 62 provided within the outlet chamber in contact with the outlet side of the filter means.

While the filter apparatus 50 is illustrated in vertical axis rotation, it may also be operated in a horizontal axis orientation, in which case the gravitational forces operating on the fluids and solids therein may be more uniform across the thickness of the filter means along a length of the cylindrical filter means. In such horizontally oriented embodiments the means for retaining filtered fluid on the downstream side of the filter means may comprise an elongate plate 85 having a convex outer surface complementary in curvature to the inner surface of the cylindrical filter means, with grooves 86 on the convex outer surface for at least temporarily retaining filtered fluid adjacent the outlet side of the filter means, for the purposes explained above herein. This elongate plate can be mounted in place by adjustably attaching same to brace members extending from a stationary partial shaft or bushing arranged coaxially with the elongate shaft 55.

As shown in FIG. 4, opposite ends of the filter means are sealed by plate members 63 and 64, and in combination with the inlet side of the filter means, help to define the outlet chamber 53. The plate members are fixed at central portions thereof to the elongate shaft 55 to transmit the rotational force of the elongate shaft to the cylindrical filter means. The elongate shaft 55 includes a central bore 65 and a plurality of radial openings 66 formed in the elongate shaft 55 in communication with the central bore 65. The central bore 65, can be said to serve as the outlet chamber 53, since the secondary filtering medium occupies most of the internal volume defined by the outlet surface of the filter means 54.

Figure 5A:
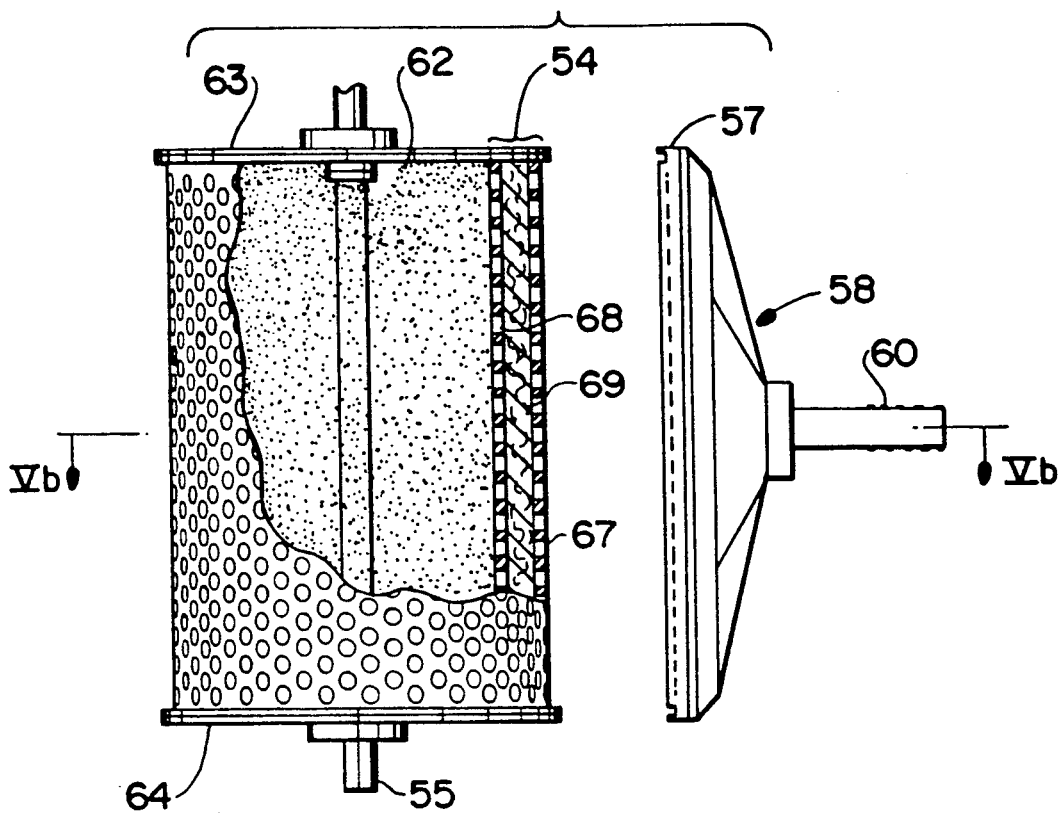
FIGS. 5a and 5b are partial cross-sectional side and top cross-sectional views, respectively, of the filter means and backwash housing shown in FIG. 4.

FIG. 5a shows a partial cross-sectional side view of the filter means 54 and the backwash housing 56 of the filter apparatus 50 shown in FIG. 4. The filter means 54 include a cylindrical perforated member 67 adjacent the inlet chamber 52, a cylindrical perforated member 68 adjacent the outlet chamber 53, and a filtering medium 69 sandwiched between the perforated members. The cylindrical perforated members generally comprise metallic members with through holes passing therethrough. The through holes in each cylindrical perforated member are preferably in substantial alignment. The filtering medium 54 can include any suitable medium depending upon the particle sizes in the unfiltered fluid, as well as the chemical nature of the fluid. Examples of the filtering medium have been discussed above herein.

Figure 5B:
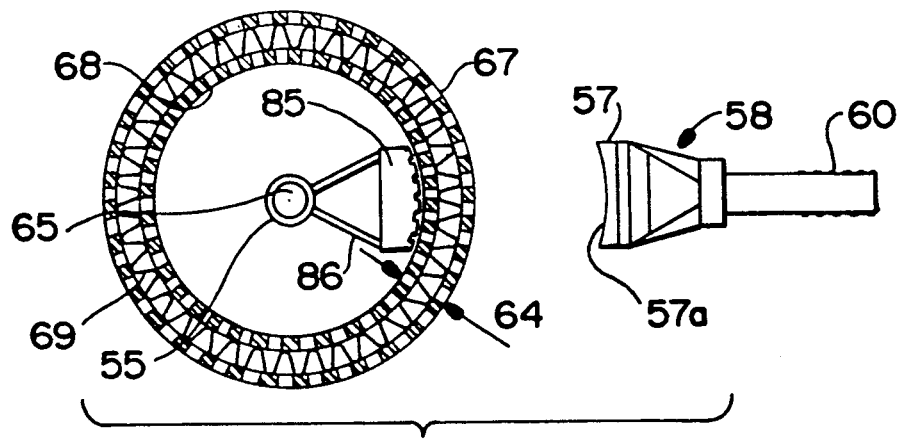

FIG. 5b shows a cross-sectional view taken along line Vb of FIG. 5a of the filter means 54 and backwash housing 56. The backwash housing 56 includes at least one sliding shoe 57 having a lip seal 57a which contacts a portion of the inlet side of the filter means 54. The lip seal 57a has a radius of curvature which substantially corresponds to the radius of curvature of the inlet surface of the rotating filter means 54. Although not specifically shown in FIGS. 4 and 5, the sliding shoe has a longitudinal slit therethrough which narrows in a direction from opposite ends of the cylindrical filter means towards the midpoint thereof. The sliding shoe can be made of any suitable material, preferably, polytetrafluoroethylene.

FIG. 5b also illustrates the relative positioning of backwash shoe 58 vis-a-vis an internal elongate grooved plate 85 for retaining filtered fluid immediately adjacent the downstream side of the filter means. This embodiment may be advantageously operated with the backwash shoe 58 oriented substantially vertically over the location of retention plate 85 (as if FIG. 5b were rotated 90% counterclockwise).

The filter apparatus 50 shown in FIG. 4 functions as follows. An unfiltered fluid medium is introduced into the inlet chamber 52 through inlet means 72 to contact the inlet side of the filter means 54. The fluid medium of the unfiltered fluid is pressurized and thus forced through the filter means 54, and particles in the unfiltered fluid are trapped on the inlet side of the filter means 54. The filter fluid medium, after passing through the filter means 54, is transported through the medium 62, through radial openings 66 in the elongate shaft 55, and then exits the filter apparatus 50 via outlet means 73 provided in communication with the central bore 65 of the elongate shaft 55.

The backwashing function is conceptually the same as in the embodiment of FIGS. 1-3. The filter means 54, via the elongate shaft 55, is rotated by the action of the motor 70 and transmission 71. Adjustable choke means are provided in any one, or preferably, all, of the inlet means 72, the outlet means 73, and the backwash outlet 59 to control the pressures in the filter apparatus 50, such that the pressure in the outlet chamber 53 is greater than the pressure in the backwash housing 56. Such control of the pressures in the filter apparatus 50 provides a back pressure in the backwash housing 56, such that accumulated particles on the inlet side of the filter means 54 are backwashed through the slit provided in the sliding shoe 57 and into the backwash housing 56 via filtered fluid passing in a reverse direction through the filter means 54. The concepts, features, and efficiency factors discussed above with regard to the embodiment of FIGS. 1-3 also apply to the filter apparatus of FIG. 4, especially the means for at least temporarily retaining filtered fluid in the downstream outlet chamber at a location immediately proximate the downstream outlet side of the filter means.

As explained above, the embodiment of FIG. 5, especially that illustrated in FIG. 5b with retention plate 85, can be advantageously used when oriented in an horizontal-axis position with the backwash shoe 58 vertically above the axis of the cylindrical filter means.

The foregoing arrangement permits continuous backwashing of the cylindrical filter means and thus, continuous filtering of unfiltered fluids containing ultrafine particles, as well as particles of a broad particle size range.

Figure 6:
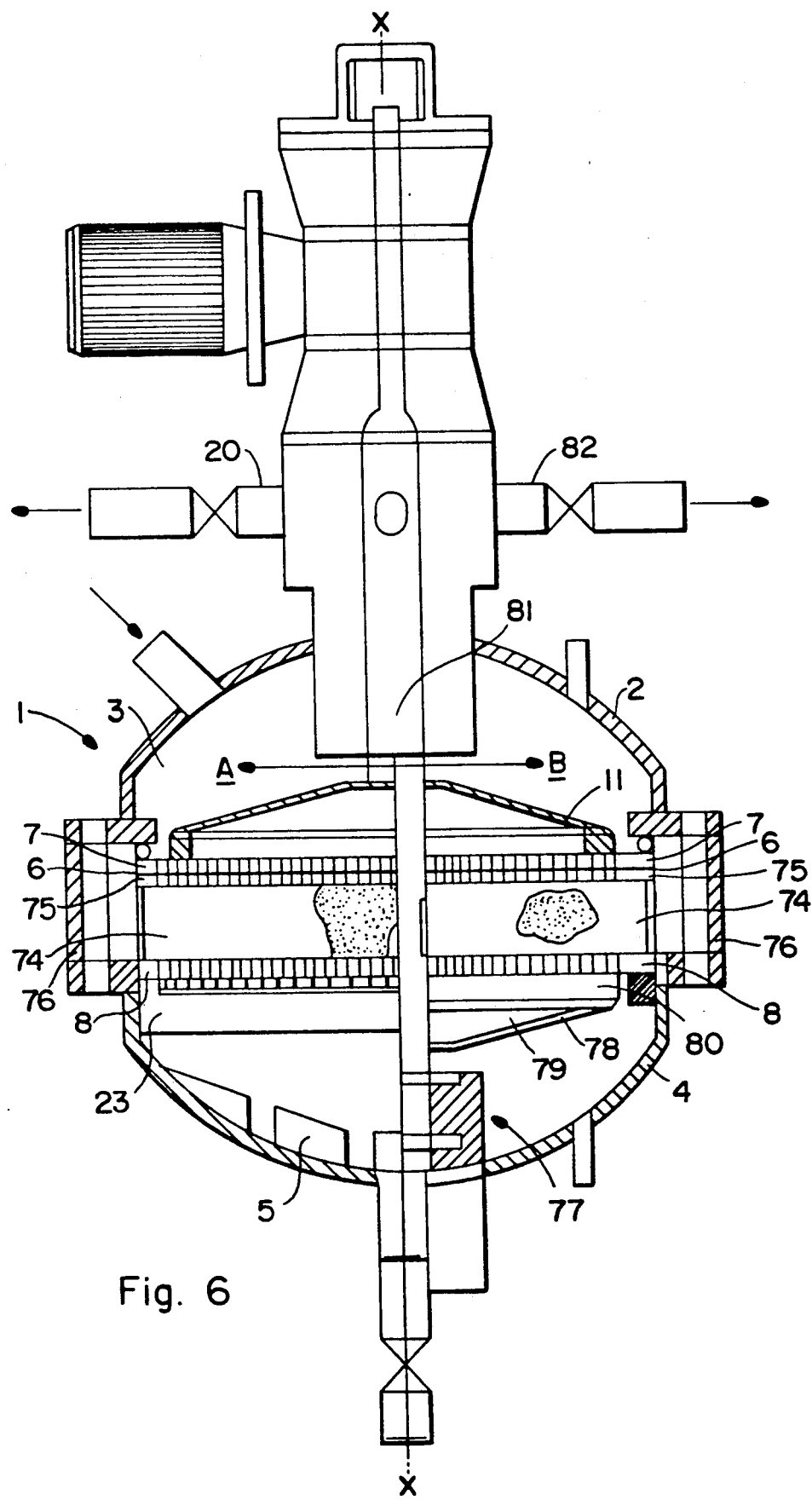
FIG. 6 is a partial cross-sectional side view illustrating two additional embodiments of the filter apparatus of the present invention.

FIG. 6 is a dual representation of two additional embodiments of the present invention. The filter apparatuses of FIG. 6 correspond generally to that shown in FIG. 1 and thus, like numerals signify like elements. The two embodiments in FIG. 6 are shown on either side of the center line X, and are designated by the letters A and B, respectively. The filter apparatus 1 of embodiment A includes an additional filter cartridge 74 provided between the upper perforated plate 7 adjacent the inlet chamber 3 and the lower perforated plate 8 adjacent the outlet chamber 5. The filter means 6 is disposed above the cartridge element 74. To facilitate secure fixing of the filter means 6, an additional perforated member 75 is interposed between the filter means 6 and the cartridge element 74. In order effectively to incorporate the filtering cartridge in the filter apparatus, an intermediate flange member 76 must be incorporated between the upper compartment chamber 2 and lower compartment chamber 4. All of the features, concepts and efficiency factors discussed above with regard to FIGS. 1-3 apply equally as well to embodiment A of FIG. 6.

The embodiment B of FIG. 6 will now be explained. Since the presence of the filtering cartridge 74 often causes difficulty in backwashing, the lower support plate 23 can be replaced with a lower backwash housing 77. The lower backwash housing 77 comprises a lower backwash hood 78 which defines a lower backwash chamber 79 proximate the outlet side of the filtering section of the filter apparatus, i.e., the lower backwash hood contacts, via sliding shoes 80, the lower porous plate 8. The lower backwash hood 78 comprises at least one sliding shoe 80 in abutting contact with the outlet side of the filtering section of the filter apparatus, as discussed above. The sliding shoe 80 of the lower backwash housing 77 has essentially the same structure as the sliding shoe of the upper backwash housing 11. The upper and lower backwash housings are rotated synchronously via hollow shaft 81 such that the lower backwash hood 78 provides back pressure through the filter means 6 into the upper backwash hood 11. The upper backwash housing 10 includes an additional backwash outlet 82 to facilitate removal of backwashed filtrate from the lower backwash housing 77. The features, concepts and efficiency factors discussed above with regard to FIGS. 1-3 also apply to embodiment B of FIG. 6.

The following examples illustrate the superior filtering capability of the present invention and are not intended to in any way limit the scope of the present invention.

EXAMPLE 1

A continuous supply of contaminated water was provided by a belt filter press of a sewage treatment plant. The water was dark in color and had previously been treated with polymeric flocculents. The apparatus illustrated in FIG. 1 was used with the filter media being a sintered bronze filter element having a pore size of 25 microns and a thickness of 6 mm.

After selecting the desired filter medium, it was installed in the apparatus of FIG. 1. The apparatus was then operated by pumping the contaminated water into the inlet at a constant rate. The outlet valve was then adjusted to maximize production of clear outlet water. The backwash outlet and backwash hood rotation rate were then adjusted to achieve a steady state inlet pressure while maintaining maximum clear water outlet.

By thus manipulating the choke means in the outlet and backwash outlet, a ratio of about 89% filtrate (i.e., filtered fluid) and 11% backflush (water containing the contaminants) was achieved in view of the relatively high total suspended solids (TSS) content in the contaminated water. The waste water was introduced into the inlet means with a TSS content of 833 mg/L and a steady state pressure of 5.5 bar. The pressure in the outlet chamber was 3.0 bar and the pressure in the backwash chamber was 0.8 bar. The filtrate flowrate exiting at the outlet, set via the adjustable choke means in the outlet, was 90 L/min, and the backwash flowrate was set in a similar manner at 12 L/min. The backwash hood rotation rate was at 5 rpm. The test was continued for 130 hours. When analyzed, the backwash had a TSS content of 95 mg/L and the filtrate had a TSS content of 21 mg/L.

EXAMPLE 2

In a second filtering step the filtered water of Example 1 was filtered through the apparatus of FIG. 1 of the present invention while using a polyethylene filter having an absolute pore size of 5 microns as the filter means. The waste water was introduced into the inlet means with a TSS content of 21 mg/L and a pressure of 2 bar. The pressure in the outlet chamber was set to 0.9 bar and the pressure in the backwash chamber was set to 0.5 bar. The flowrate of filtrate exiting the outlet means was set at 130 L/min and the backwash flowrate was set at 3 L/min. The backwash hood was rotated at 4 rpm and the test was continued for 300 hours. When tested, the backwash had a TSS content of 74 mg/L and the filtrate had a TSS content of 1.58 mg/L.

Examples 1 and 2 demonstrate that the filter apparatus of the present invention can achieve better results than a traditional sewage treatment plant at drastically reduced operating cost and space requirements. The EPA currently requires that treated water exiting a sewage treatment plant have no greater than 30 mg/L TSS. As noted in Example 2 above, the filtrate exiting the filtering apparatus of the present invention had a TSS content of 1.58 mg/L.

EXAMPLE 3

River water was filtered through the filter apparatus of FIG. 1 of the present invention while using a polyethylene filter element having an absolute pore size of 1 micron as the filter means. The waste water was introduced into the inlet means with a TSS content of 12.5 mg/L and a pressure of 2.2 bar. The pressure in the outlet chamber was set to 0.8 bar and the pressure in the backwash chamber was set to 0.3 bar. The filtrate flowrate was set at 13.0 L/min and the backwash flowrate was set at 2.0 L/min. The backwash hood was rotated at 5 rpm and the test was continued for 350 hours. When tested, the backwash had a TSS content of 8.5 mg/L and the filtrate had a TSS content of 0.645 mg/L.

EXAMPLE 4

Well water from an existing Fauquier County, Virginia water system was filtered through the apparatus of FIG. 1 of the present invention using a polyethylene filter element having an absolute pore size of 3 microns as the filter means. The pressure at which the water was introduced into the inlet chamber of the filter apparatus was 2.8 bar. The backflush pressure in the backflush outlet was set at 0.3 bar and the pressure in the outlet chamber was set at 1.7 bar. The hollow shaft and backwash hood were revolved at 6 rpm. The unfiltered water had a TSS content of 35.5 mg/L and an iron concentration of 2.85 mg/L. The filtrate flowrate was set at 12.0 L/min, and the filtrate had a TSS content of 3.5 mg/L and an iron concentration of 0.9 mg/L. The backflush flowrate was set at 2 L/min. A typical governmental limit for iron content in drinking water is about 1.5 mg/L.

EXAMPLE 5

Waste oil from a machine shop was filtered through the apparatus of FIG. 1 of the present invention while using a filter having an absolute pore size of 20 microns. The oil was introduced into the inlet chamber at a pressure of 7.5 bar. The pressure in the backwash chamber was adjusted to 4 bar and the pressure in the outlet chamber was adjusted to 3.5 bar. The backwash hood was rotated at 12 rpm and the flowrate of filtrate exiting the outlet means was set at 60 L/min. The initial concentrations of iron, lead, and dissolved lead in the waste oil were 1.8, 4.0 and 1.3 mg/L, respectively. Analysis of the output filtrate revealed iron, lead and dissolved lead concentrations of 1.7, 0.4 and 0.2 mg/L, respectively.

EXAMPLE 6

The original waste drill oil utilized in Example 5 was filtered through the filter apparatus of FIG. 1 of the present invention using filter means having an absolute pore size of 2 microns. The waste oil was introduced into the inlet chamber at a pressure of 7.5 bar, the pressure in the backwash chamber was set at 2 bar and the pressure in the outlet chamber was set at 5.5 bar. The speed of rotation of the backwash hood was set at 12 rpm and the flowrate of filtrate exiting the outlet means was set at 70 L/min. The original concentrations of iron, lead and dissolved lead in the waste machine oil was the same as above. Analysis of the outlet filtrate revealed iron, lead and dissolved lead contents of 0.2, less than 0.1 and less than 0.1 mg/L, respectively.

EXAMPLE 7

The waste drill oil of Example 5 was filtered through the filter apparatus of FIG. 1 of the present invention using filter means having an absolute pore size of 20 microns. The drill oil was introduced into the inlet chamber at a pressure of 7.5 bar, the pressure in the backwash chamber was set at 2 bar, and the pressure in the outlet chamber was set at 5.5 bar. The speed of rotation of the backwash hood was set at 12 rpm and the flowrate of filtrate exiting the outlet means was set at 30 L/min. The initial concentrations of cadmium, chromium, copper, lead, and zinc in the drill oil were less than 0.01, less than 0.05, 0.40, 0.8 and 0.66, respectively. Analysis of the output filtrate revealed concentrations of cadmium, chromium, copper, lead, and zinc of less than 0.01, less than 0.05, 0.03, less than 0.05, and 0.05 mg/L, respectively.

EXAMPLE 8

A mixture of water containing the waste drill oil of Example 5 was filtered through the filter apparatus of FIG. 1 of the present invention using filter means having an absolute pore size of 2 microns. The coolant oil and water mixture was introduced into the inlet chamber at a pressure of 7.5 bar, the pressure in the backwash chamber was set at 2 bar, and the pressure in the outlet chamber was set at 5.5 bar. The speed of rotation of the backwash hood was set at 12 rpm and the flowrate of filtrate exiting the outlet means was set at 60 L/min. The coolant oil and mixture had initial concentrations of cadmium, chromium, copper, lead, and zinc of less than 0.01, less than 0.05, 0.16, less than 0.05 and 1.41 mg/L, respectively. Analysis of the output filtrate revealed concentrations of cadmium, chromium, copper, lead and zinc of less than 0.01, less than 0.05, less than 0.01, less than 0.05, and 0.04 mg/L, respectively.

EXAMPLE 9

Sludge from a waste treatment plant was filtered through the filter apparatus of FIG. 1 of the present invention utilizing filter means having an absolute pore size of 10~13 microns. The sludge was introduced into the inlet chamber of 4.5 bar, the pressure in the outlet chamber was set at 2.5 bar, and the pressure in the backwash chamber was set at 0.5 bar. The speed of rotation of the backwash hood was set at 6 rpm. The flowrate of filtrate exiting the outlet means was set at 80 L/min and the flowrate of backwash exiting the backwash outlet was set at 16 L/min. The filtering operation was continued continuously for 110 hours. The sludge had an initial concentration of BOD (Biological Oxygen Demand over a 5-day period), chlorides, nitrogen, TSS and dissolved oxygen of 1814, 340, 356, 6440, and 0.3 mg/L, respectively. Analysis of the filtrate revealed concentrations of BOD, chlorides, nitrogen, TSS and dissolved oxygen of 3, 218, 3, 50 and 6.9 mg/L, respectively.

In addition to the above examples, other more specific features of the present invention have been realized. For example, although any suitable filter means can be utilized in the filter apparatus of the invention, filter means having a variable porosity are preferable. More specifically, filter means which have increasing porosity from the inlet side toward the outlet side thereof enhance the backwashing ability of the filter apparatus. A specific example of such filter means includes an upper layer on the inlet side having an absolute pore size of about 10 microns, an intermediate layer having an absolute porosity of about 25 microns, and a lower layer on the outlet side having an absolute pore size of about 40 microns.

Additionally, when filtering drinking water, it is preferable to employ a secondary filtering medium in the outlet chamber below the support plate. The secondary filtering medium has an upper layer in contact with the bottom surface of the support plate which has an absolute pore size of about 10 microns and a lower layer which has an absolute pore size of about 20 microns. Interposed between the two layers is a bed of charcoal particles having an average particle size of about 0.25 mm. The secondary filtering medium is sealed on its outer periphery such that both the filter means and secondary filtering medium can be backwashed.

While the present invention has been explained in detail with reference to the appended drawings, it is understood that various modifications can be made in the filter apparatus of the present invention without departing from the spirit of the invention or the scope of the claims hereof.

What is claimed is:

1. A backwash filter apparatus for removing solids from fluids, comprising:
    a filter housing comprising an inlet chamber having an inlet permitting introduction of an unfiltered fluid into the inlet chamber, and an outlet chamber having an outlet permitting discharge of filtered fluid from the outlet chamber;
    filter means located in said filter housing and rigidly supported between said inlet chamber and said outlet chamber;
    a backwash housing comprising a backwash hood having a backwash outlet therein, and at least one sliding shoe in sliding contact with an inlet side of said filter means, said sliding shoe having an opening therethrough which provides communication between an area on said filter means and an interior of the backwash housing, said sliding shoe providing a virtually leakproof seal on the inlet side of the filter means thereby separating the interior of the backwash housing and said inlet chamber; and
    retention plate means for providing sufficient retention of filtered fluid proximate at least a substantial portion of an outlet side surface of said filter means to allow substantially instantaneous and continuous backwashing of said filter means;
    wherein said backwash housing provides continuous backwashing of said filter means over a rinsing area accessed by the opening in said sliding shoe.

2. The filter apparatus of claim 1, wherein said backwash housing further comprises: a backwash chamber proximate said filter means, said backwash chamber being defined by said backwash hood; and a hollow cylindrical member fixed to said backwash hood for providing communication between said backwash chamber and said backwash outlet.

3. The filter apparatus of claim 2, wherein a portion of said backwash hood is sealed adjacent said filter means by a plate member having an opening therethrough, and said sliding shoe is fixed on said plate member such that the opening in said sliding shoe aligns with the opening in said plate member.

4. The filter apparatus of claim 2, further comprising means for adjusting a position of said hollow cylindrical member in a direction substantially normal to said filter means, for varying the amount of pressure contact between said sliding shoe and said filter means.

5. The filter apparatus of claim 1, further comprising an upper perforated member positioned on the inlet side of said filter means and a lower perforated member positioned on the outlet side of said filter means, said perforated members being arranged such that holes formed therethrough are mutually substantially aligned.

6. The filter element of claim 5, wherein said sliding shoe covers at least two adjacent rows of holes in said upper perforated member.

7. The filter apparatus of claim 1, wherein said retention plate means comprises any means for at least temporarily retaining filtered fluid adjacent an outlet side surface of said filter means and readily dispersing that filtered fluid in a direction parallel to the outlet side surface of said filter means.

8. The filter apparatus of claim 7, wherein said outlet chamber comprises a volume for collecting filtered fluid.

9. The filter apparatus of claim 1, wherein said sliding shoe comprises a substantially rigid material which will maintain a virtually leakproof seal between the inlet chamber and the interior of the backwash housing.

10. The filter apparatus of claim 1, further comprising shoe comprises polytetrafluoroethylene.

11. The filter apparatus of claim 1, further comprising adjustable choke means in the backwash outlet for regulating the backwash flowrate and pressure in the backwash housing.

12. The filter apparatus of claim 1, further comprising adjustable choke means in the outlet of the outlet chamber for regulating the outlet flowrate and pressure in the outlet chamber.

13. The filter apparatus of claim 1, further comprising a suction pump connected to said backwash outlet for regulating the pressure in the backwash housing.

14. The filter apparatus of claim 1, wherein said filter means includes a filter media having an absolute pore size of not more than about 1 micron.

15. A backwash filter apparatus for removing solids from fluids, comprising:
    a filter housing comprising an upper compartment defining an inlet chamber having an inlet for permitting introduction of an unfiltered fluid into the inlet chamber, and a lower compartment defining an outlet chamber having an outlet for permitting discharge of a filtered fluid from the outlet chamber;

stationary filter means located in the said filter housing and rigidly supported between said inlet chamber and said outlet chamber;

a backwash housing comprising an elongate backwash hood having a backwash outlet therein, mounted for rotation about an axis normal to said filter means, said backwash hood comprising at least one sliding shoe in contact with an inlet side of said filter means, said sliding shoe having a radially extending slit therethrough which provides communication between a substantial radially elongate area on said filter means and an interior of said backwash housing, said sliding shoe providing a virtually leakproof seal on the inlet side of the filter means thereby separating the interior of said backwash housing and said inlet chamber; and retention plate means for providing sufficient retention of filtered fluid proximate at least a substantial portion of an outlet side surface of said filter means to allow substantially instantaneous and continuous backwashing of said filter means said retention plate means comprising a lower rigid support plate having an upper surface which contacts and supports said filter means, said upper surface comprising a plurality of grooved formed therein which temporarily retain filtered fluid in said outlet chamber at a location immediately proximate the outlet side surface of said filter means;

wherein said backwash housing provides continuous backwashing of said filter means over a rinsing area accessed by the slit in said sliding shoe.

16. The filter apparatus of claim 15, wherein the plurality of grooves in said lower support plate are concentric grooves, and further comprise a plurality of radial grooves formed in said upper surface, and a central opening formed through said support plate in communication with said outlet chamber, said radial grooves providing communicating paths between said concentric grooves and said central opening.

17. The filter apparatus of claim 16, further comprising valve means positioned in said central opening such that said outlet chamber is defined by a volume located between the upper surface of said support plate and the outlet side of said filter means.

18. The filter apparatus of claim 15, wherein said backwash housing further comprises: a backwash chamber proximate said filter means, said backwash chamber being defined by said elongate backwash hood; and a rotating hollow shaft arranged normal to said filter means and fixed to said backwash hood for providing communication between said backwash chamber and said backwash outlet, and for rotating said backwash hood independently of said filter means.

19. The filter apparatus of claim 18, wherein a portion of said elongate backwash hood adjacent said filter means is sealed by an elongate plate member having two radially extending slits therethrough, and said sliding shoes are fixed on said plate member such that the slits in said sliding shoes are aligned with the slits in said plate member.

20. The filter apparatus of claim 19, wherein said elongate plate member abuts an open end of said rotating hollow shaft, and said rotating hollow shaft includes a plurality of radially extending passages therethrough communicating between an interior of said rotating hollow shaft and said backwash chamber.

21. The filter apparatus of claim 19, wherein the radially extending slit in each sliding shoe narrows from a radially outer portion of the shoe towards a radially inner portion of the shoe.

22. The filter apparatus of claim 18, wherein said backwash housing further comprises means for supporting said rotating hollow shaft therein and for supporting a backwash collector chamber in communication with said backwash outlet.

23. The filter apparatus of claim 22, wherein said rotating hollow shaft further comprises radial openings in the upper end thereof, said radial openings communicating between an interior of said rotating hollow shaft and said backwash collector chamber.

24. The filter apparatus of claim 15, wherein said elongate backwash hood comprises two diametrically opposed branches each of which extends radially from said rotating hollow shaft, and a sliding shoe having a radially extending slit therethrough, fixed on each of said branches contiguous with said filter means.

25. The filter apparatus of claim 15, further comprising means for adjusting the axial position of said rotating hollow shaft, for varying the amount of pressure contact between said sliding shoe and said filter means.

26. The filter apparatus of claim 15, further comprising an upper perforated member positioned on the inlet side of said filter means adjacent said inlet chamber and a lower perforated member positioned on the outlet side of said filter means adjacent said outlet chamber, said perforated members being arranged such that holes formed therethrough are mutually substantially aligned.

27. The filter apparatus of claim 26, wherein said perforated member adjacent said inlet chamber is an upper support for the filter means, and said filter means is clamped between said upper support and said lower support plate.

28. The filter apparatus of claim 27, wherein said upper compartment further comprises an inwardly extending annular projection for engaging, through an O-ring, an outer peripheral, upper surface of said perforated member adjacent said inlet chamber.

29. The filter apparatus of claim 15, wherein said lower support plate is arranged on radially extending supporting members fixed in the lower compartment of the filter housing.

30. The filter apparatus of claim 15, wherein said sliding shoe comprises a substantially rigid material which will maintain a virtually leakproof seal on the inlet side of the filter means thereby separating the inlet chamber and an interior of the backwash housing.

31. The filter apparatus of claim 30, wherein said sliding shoe comprises polytetrafluoroethylene.

32. The filter apparatus of claim 15, further comprising means for rotating said backwash hood about the axis normal to said filter means.

33. The filter apparatus of claim 32, additionally comprising means for varying the speed of rotation of the backwash hood.

34. The filter apparatus of claim 33, including means for varying the speed of rotation of the backwash hood as a function of the amount of solids accumulated on the filter means.

35. The filter apparatus of claim 15, further comprising adjustable choke means in the backwash outlet for controlling the backwash flowrate and pressure in the backwash housing.

36. The filter apparatus of claim 15, further comprising adjustable choke means in the outlet of the outlet chamber for controlling the outlet flowrate and pressure in the outlet chamber.

37. The filter apparatus of claim 15, further comprising a suction pump connected to said backwash outlet for controlling the pressure in the backwash housing.

38. The filter apparatus of claim 17, wherein said filter means includes a filter media having an absolute pore size of not more than about 1 micron.

39. A backwash filter apparatus for removing solids from fluids, comprising:
- a filter housing comprising an inlet chamber with an inlet permitting introduction of unfiltered fluid into the inlet chamber, and an outlet chamber with an outlet permitting discharge of filtered fluid from the outlet chamber;
- cylindrical, structurally rigid filter means located in said filter housing between said inlet chamber and said outlet chamber, said filter means being rotatable within said filter housing about a central axis of said cylindrical filter means;
- a stationary backwash housing comprising at least one sliding shoe in contact, along a region parallel to the central axis of the cylindrical filter means, with an inlet side of said rotatable filter means, said sliding shoe having an elongate slit therethrough which provides communication between a substantial length of an inlet surface of said cylindrical filter means and an interior of said stationary backwash housing, said sliding shoe providing a virtually leakproof seal on the inlet side of the filter means thereby separating the interior of said stationary backwash housing and said inlet chamber; and
- means for providing sufficient retention of filtered fluid proximate at least a substantial portion of an outlet side surface of said filter means to allow substantially instantaneous and continuous backwashing of said filter means;
- whereby said stationary backwash housing provides continuous backwashing of said filter means over a rinsing area defined by the slit in said sliding shoe.

40. The filter apparatus of claim 39, wherein said means for providing sufficient retention of filtered fluid comprises a solid, permeable, filter medium provided in said outlet chamber in contact with the outlet side of said filter means.

41. The filter apparatus of claim 40, wherein the solid, air permeable filtering medium comprises at least one material selected from the group consisting of activated carbon and particulate marble.

42. The filter apparatus of claim 39, wherein said means for providing sufficient retention of filtered fluid comprises a solid plate having an outer convex surface of curvature complementary to the internal curvature of the outlet side of the filter means, with fluid retaining grooves in said outer convex surface which is adjacent said outlet side of the filter means, and said grooved plate and the backwash filter housing are radially aligned with each other in the same section of the cylindrical filter means.

43. The filter apparatus of claim 39, further comprising means for rotating said cylindrical filter means about its central axis.

44. The filter apparatus of claim 43, additionally comprising means for varying the speed of rotation of the cylindrical filter.

45. The filter apparatus of claim 44, including means for varying the speed of rotation of the cylindrical filter as a function of the amount of solids accumulated on the filter means.

46. The filter apparatus of claim 39, wherein said backwash housing further comprises: a backwash hood which defines a backwash chamber proximate said filter means; and an adjustable nozzle arm fixed to said backwash hood and communicating between said backwash chamber and said backwash outlet.

47. The filter apparatus of claim 46, further comprising means for adjusting a radial position of said adjustable nozzle arm radially with respect to the cylindrical filter means, for varying the amount of pressure contact between the stationary sliding shoe and the rotating filter means.

48. The filter apparatus of claim 39, wherein said sliding shoe further comprises a lip seal which contacts said filter means, said lip seal having a radius of curvature which corresponds to the radius of curvature of the inlet surface of said filter means.

49. The filter apparatus of claim 39, wherein the slit in said sliding shoe narrows in a direction from opposite ends of said filter means towards the midpoint thereof.

50. The filter apparatus of claim 39, wherein said filter means comprises a cylindrical perforated member adjacent said inlet chamber, a cylindrical perforated member adjacent said outlet chamber, and a filtering medium sandwiched between the perforated members.

51. The filter apparatus of claim 39, wherein opposite axial ends of said cylindrical filter means are sealed by plate members to form said outlet chamber, and said plate members are fixed to an elongate shaft coaxial with said central axis of said cylindrical filter means, wherein said shaft rotates said filter means.

52. The filter apparatus of claim 51, wherein said elongate shaft includes a central bore and a plurality of radial openings formed in said elongate shaft in communication with said central bore.

53. The filter apparatus of claim 39, wherein said sliding shoe comprises a substantially rigid material which will maintain said virtually leakproof seal.

54. The filter apparatus of claim 53, wherein said sliding shoe comprises polytetrafluoroethylene.

55. The filter apparatus of claim 39, further comprising adjustable choke means in the backwash outlet for controlling the backwash flowrate and pressure in the backwash housing.

56. The filter apparatus of claim 39, further comprising adjustable choke means in the outlet of the outlet chamber for controlling outlet flowrate and pressure in the outlet chamber.

57. The filter apparatus of claim 39, further comprising a suction pump connected to said backwash outlet for controlling pressure in the backwash housing.

58. A backwash filter apparatus for removing solids from fluids, comprising:
- a first housing comprising an upper compartment defining an inlet chamber having an inlet permitting introduction of unfiltered fluid into the inlet chamber and a lower compartment defining an outlet chamber having an outlet permitting discharge of filtered fluid from the outlet chamber;
- stationary, filter means located in said filter housing and rigidly supported between said inlet chamber and said outlet chamber;
- an upper backwash housing comprising an upper elongate backwash hood which defines an upper backwash chamber proximate an inlet side of said filter means, said upper elongate backwash hood being rotatable about an axis normal to said filter means, said upper elongate backwash hood comprising a backwash outlet therein and at least one sliding shoe in contact with an inlet side of said filter means, said sliding shoe having a radially extending slit therethrough which provides communication between a substantial radially elongate area of said filter means and the interior of said upper backwash housing, said sliding shoe providing a virtually leakproof seal on the inlet side of the filter means thereby separating the interior of said backwash housing and said inlet chamber; and retention plate means for retaining filtered fluid in said outlet chamber at a location immediately proximate an outlet side of said retention plate filter means, said means comprising a lower backwash housing comprising a lower elongate backwash hood which defines a lower backwash chamber proximate an outlet side of said filter means, said lower backwash hood comprising at least one sliding shoe in contact with an outlet side of said filter means, said lower backwash hood being arranged in substantial axial alignment for synchronous rotation with said upper backwash hood;

wherein the upper and lower backwash housings provide continuous backwashing of said filter means over a rinsing area defined by the slits in said sliding shoes.

59. The filter apparatus of claim 58, wherein said upper backwash housing further comprises two backwash outlets in communication with said upper backwash chamber and said lower backwash chamber, respectively.

* * * * *